April 16, 1940.   J. A. J. BENNETT   2,197,677
BLADED AIRCRAFT SUSTAINING ROTOR
Filed March 31, 1938   2 Sheets-Sheet 1

INVENTOR.
James Allan Jamieson Bennett
BY
Symmestvedt & Lechner
ATTORNEYS

April 16, 1940.    J. A. J. BENNETT    2,197,677
BLADED AIRCRAFT SUSTAINING ROTOR
Filed March 31, 1938    2 Sheets-Sheet 2

INVENTOR.
James Allan Jamieson Bennett
BY
Synnestvedt & Lechner
ATTORNEYS

Patented Apr. 16, 1940

2,197,677

UNITED STATES PATENT OFFICE 2,197,677

BLADED AIRCRAFT SUSTAINING ROTOR

James Allan Jamieson Bennett, Esher, England, assignor, by mesne assignments, to Autogiro Company of America, a corporation of Delaware Application March 31, 1938, Serial No. 199,149
In Great Britain April 6, 1937

24 Claims. (Cl. 244—18)

This invention relates to bladed aircraft sustaining rotors and is especially useful in a sustaining rotor of the type which is autorotationally actuable in flight. The invention, moreover, is particularly concerned with blade mounting pivots for an aircraft sustaining rotor.

Heretofore, rotors of this type have commonly employed "flapping" pivots for the blades and in some prior pivoted blade rotors, blades have further been mounted on the generally upright rotative hub by means of one or more additional pivots including a pitch pivot having its axis obliquely inclined with respect to the longitudinal axis of the blade so that lagging and leading displacements of the blade are accompanied by changes in the blade pitch.

Provision has also been made heretofore for driving rotors of this type, the drive mechanism and the pitch change pivot being so arranged as to provide for decrease of pitch upon application of the drive and for increase of pitch upon cessation of the drive, whereby a high initial rotor R. P. M. may be attained with low blade pitch, prior to take-off from the ground and then, upon disconnection of the drive, the blade pitch is caused to move to a higher value, with the result that a high degree of initial thrust is produced to effect a steep or substantially vertical take-off of the craft.

In some prior constructions the pitch pivot has also been relied on to accommodate lag and lead displacements of the blade in normal autorotational flight although, alternatively, an additional "drag" pivot is sometimes employed for this purpose.

The invention of the present application has reference to structures of the general nature outlined above and one of the primary objects of the invention is to provide a pitch change pivot which is effective to change the blade pitch under the different conditions of take-off and flight but which is rendered inoperative or ineffective during normal autorotational flight.

Preferably, also, the invention provides for accommodation of lag and lead displacements incident to autorotational flight operation by means of a separate drag hinge.

In accordance with the invention, the foregoing is accomplished in a manner providing automatic locking of the pitch change pivot during normal flight operation, and automatic release of the locking device for purposes of direct or jump take-off. Still further, the arrangement of the invention effects automatic reduction of blade pitch upon application of the starting or driving torque and movement of the blade on the pitch change pivot from the lower to the higher pitch position automatically under the influence of centrifugal force of rotation.

How the foregoing is accomplished will appear to best advantage from a consideration of the following description referring to the accompanying drawings, in which—

Figure 3:
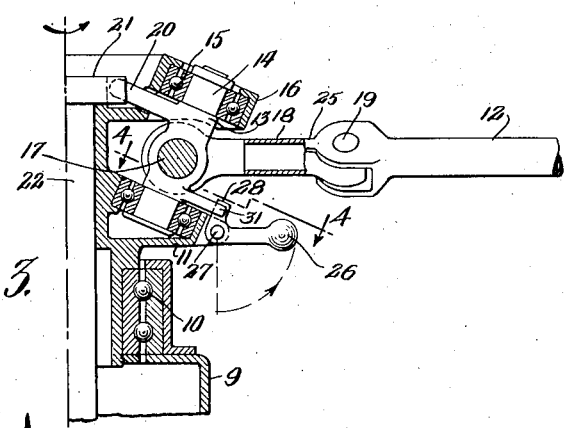
Figure 3 is a half sectional view similar to the showing of Figure 1 but illustrating a modified arrangement.

Figures 5 to 9 inclusive are views similar to Figure 3 but illustrating further modifications.

Figures 2, 9:
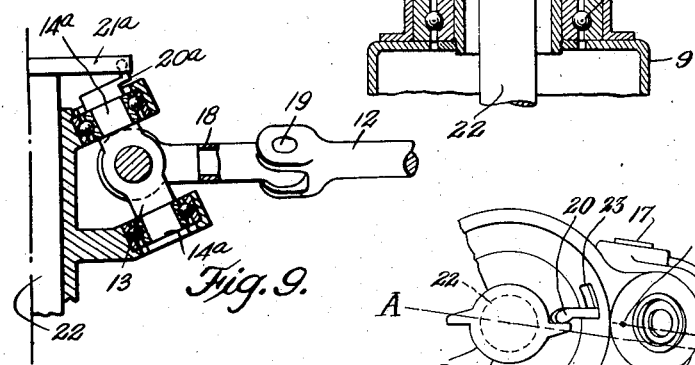
Figure 2 is a top plan view of a portion of the mechanism shown in Figure 1.
Figure 10:
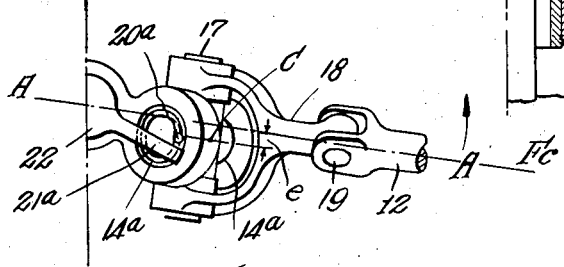

Figure 10 is a top plan view of the modification illustrated in Fig. 9.

Before considering in detail the features of the several embodiments illustrated, it is here noted that for a full description of the direct or jump take-off method and pivots suitable for accomplishing this method, reference may be had to copending applications of Juan de la Cierva, Serial No. 738,349, filed August 3, 1934, corresponding to British Patent No. 420,322, accepted November 29, 1934, and also Serial No. 139,814, filed April 29, 1937, corresponding to British Patent No. 474,681, accepted November 4, 1937.

It is further noted that triple pivot blade mounting (incorporating flapping, pitch and drag pivots) is disclosed in my copending application Serial No. 21,454, filed May 14, 1935, issued April 18, 1939, as Patent No. 2,154,601, corresponding to British Patent No. 438,525, accepted November 18, 1935.

The present invention contemplates improvements on arrangements of the type disclosed in said prior applications.

Figure 1:
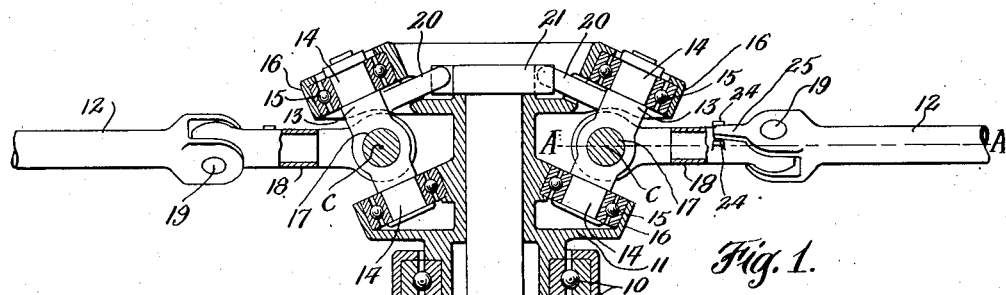
Figure 1 is a vertical sectional view of a portion of a rotor head with a pair of blades connected therewith by means of pivot mechanism constructed in accordance with the invention.

In the form of Figures 1 and 2, a non-rotative hub housing is indicated at 9, this housing serving to enclose main bearings 10 for the rotative hub part 11. The rotor blade spar 12 is connected to the rotative hub part 11 by means of a universal joint being constituted by a block 13 having trunnions 14 rotatably mounted by bearings 15 in bearing housings 16 which are preferably formed directly on the hub. The trunnions 14 provide an upwardly and outwardly inclined pitch pivot and the block 13 is further provided with trunnions 17 on which a forked extension link 18 is oscillatable. The trunnions 17 thus provide a flapping pivot for the blade. The link 18 is connected with the blade spar 12 by means of a drag pivot 19 here shown as being inclined backwardly and upwardly with reference to the direction of rotation, indicated by an arrow in Figure 2.

The trunnion block 13 is provided with a lever 20 projecting generally radially inwardly and adapted to be engaged by a projection 21 carried by shaft 22 which is coaxial with the hub. This shaft is intended to be driven by any suitable source of power, such as the propulsion engine (not shown) for the craft and the torque delivered to the rotor in this way serves to set it in rotation prior to effecting take-off. Shaft 22, furthermore, may turn within the hub 11 and by virtue of this and also of the interengagement of elements 20 and 21, the transmission of the drive to the blade positively assures lagging movement of the blade about the pitch pivot 14—14 upon operation of the drive. The travel of the lever 20 and hence the movement of the blade on the pitch pivot 14—14 is limited by the ends of slot 23 through which the lever 20 passes.

For further description of a drive mechanism of the type mentioned just above, reference may be had to my copending application Serial No. 205,352, filed April 30, 1938, corresponding to British application No. 12,398 of April 30, 1937.

While the range of pitch change permitted may be different wtih different rotors, the ends of slot 23 as here shown are arranged to limit blade pitch movement to a range defined on the one hand by the substantially zero lift value and, on the other hand, by a value suitable for substantially normal autorotational flight (the position of Figure 2). The rear end of slot 23 defines the limit of movement of the blade in the leading or maximum pitch sense about axis of pivot 14—14. With the blade in this position (Figure 2), which is in effect the true radial position when viewed in plan, the axis of the pitch pivot 14—14 passes the line A—A in a forwardly offset relation with respect thereto, the amount of the offset e constituting the distance between the center C of this pivot and the line A—A. There is, therefore, a centrifugal moment acting on the trunnion block 13 tending to rotate it in a leading direction with respect to the hub, the magnitude of the moment being represented by $F_c$ multiplied by $e$, $e$ being the lever arm of the force $F_c$ about point C.

Since, in free autorotative flight there is no pressure between the projection 21 and the lever 20, the trunnion block 13 is displaced by the restoring moment in a leading direction until the lever 20 engages the rear end of the slot 23 (the position of Figure 2). This condition results in locking of the pitch pivot in normal autorotative flight.

The offset and hence the centrifugal locking moment is preferably of substantial magnitude even when the extension link 18 is in its fully leading position; and as will readily be seen from Figure 2 the desired amount of offset can conveniently be secured, for example, by making the inner forked end of the extension link unsymmetrical with respect to the trunnion block, the leading arm of the fork being made longer than the trailing arm.

It will be seen that an excessive leading displacement of the blade about the drag pivot 19 would cause the offset $e$ to become zero or negative, in which case the locking action of the centrifugal force on the pitch pivot would disappear. It is, therefore, important to provide means limiting at least the leading displacement of the blade about the pivot 19. For this purpose stop devices 24—24 are mounted on the extension link 18, to cooperate with the intermediate stop 25 which is movable with the blade spar 12. Preferably these stops are arranged beyond the normal range of oscillation of the blade upon the pivot 19 in flight.

When shaft 22 is driven prior to starting, the projection 21 engages lever 20 and tends to rotate the trunnion block in a lagging direction about the pitch pivot 14—14. As the block, and with it the link 18, increase their lag about this pivot, the moment of centrifugal force $F_c$ about the center C of the trunnion block increases, but the projection 21 and lever 20 are so proportioned that the driving force applied to the lever 20 always has sufficient leverage about the center of the trunnion block to overcome the centrifugal restoring moment, even in the position of maximum lag, so that during the application of the drive the lever 20 is held firmly against the leading end of slot 23, the position of which is determined by the consideration that when the blade is driven and, therefore, in the fully lagging position, the pitch angle of the blade is to be zero.

Figure 4:
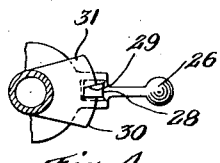
Figure 4 is a view taken as indicated by the line 4—4 on Figure 3.

In the embodiment illustrated in Figures 3 and 4, the centrifugal restoring moment of the blade itself is not relied upon for locking the pitch pivot, an auxiliary locking device responsive to centrifugal force being employed for this purpose. The general arrangement of this embodiment (Figures 3 and 4) is similar in many respects to that described above and corresponding parts have, therefore, been designated by the same reference numerals.

In Figures 3 and 4 the centrifugal locking device includes a weighted lever 26 which is pivoted at 27 on the hub 11 in such manner that it can swing outwardly under the action of centrifugal force. The lever 26 is provided with a projection 28 engageable in a notch 29 formed in the arcuate edge 30 of a plate 31 secured to or integral with the trunnion block 13, the notch 29 being so positioned that it is in registry with the projection 28 when the extension link 18 is in the fully leading position with respect to the hub 11, as defined by the engagement of the lever 20 with the rear end of the slot 23, as shown in Figure 2. In any other position of the link 18 and trunnion block 13, the projection 28 rides on the arcuate surface 30 of the plate 31 and no locking action takes place.

The device, therefore, operates in such a way that as long as a driving force is being transmitted by the projection 21 of the shaft 22 to the lever 20, the trunnion block and the link 18 are caused to lag with respect to the hub. However, when the drive ceases and the blades are restored to the normal radial position by the moment of the centrifugal force about the center C of the trunnion block 13, the projection 28, under the influence of centrifugal force acting on the weighted lever 26, enters the notch 29 and locks the trunnion block 13 to the hub.

Although in this construction the centrifugal force developed by the blade itself is not relied on for locking the pitch pivot, it is important that the rear end of the slot 23, defining the fully lagging position of the link 18, be so placed that the offset $e$ of the centrifugal force $F_c$ behind the center of the trunnion block cannot become zero or change its sign.

Figure 5:
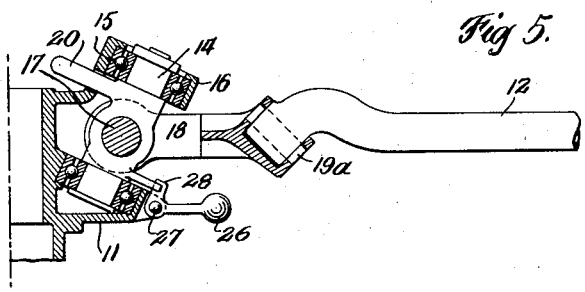
Figure 6:
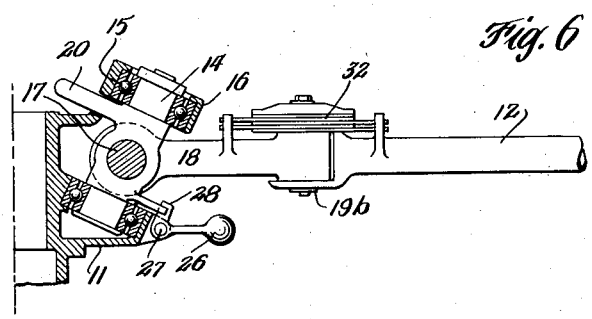

The arrangements of Figures 5 and 6 are in most respects similar to that described above, the only essential difference being in the type of drag hinge employed. With a drag hinge upwardly and rearwardly inclined as in the forms of Figures 1 and 3, the lagging and leading oscillations of the blade in flight are aerodynamically damped. For certain purposes, however, it is advantageous to incline the drag pivot inwardly and upwardly with reference to the axis of the hub, a pivot of this type being shown at 19a in Figure 5. If desired, the inward and upward inclination shown in Figure 5 may be combined with an inclination in the plane perpendicular to the blade axis, as in Figure 3.

Figure 6 shows a further modification in which the extension link 18 is connected to the blade by means of a pivot 19b whose axis is substantially parallel to the axis of rotation. In this case, the lagging and leading oscillations of the blade in flight are not aerodynamically damped and it is, therefore, preferable to employ a friction or other damping device 32 acting to restrain movement of the blade about the axis of pivot 19b.

Figure 7:
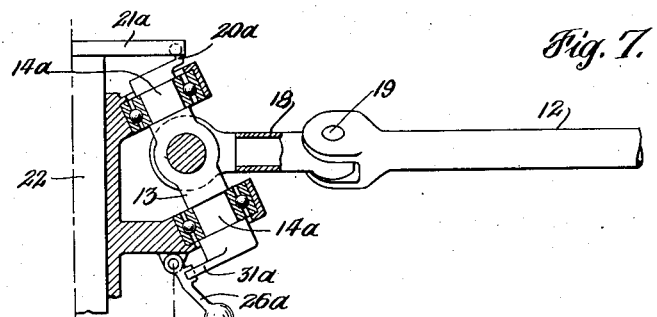

Figure 7 shows a form of construction similar in many respects to that shown in Figure 3, and having corresponding parts indicated by the same reference numerals, although in this form the axis of the pitch pivot 14a—14a is inclined inwardly and upwardly with respect to the axis of the hub. In this construction the displacement of the blade in a leading sense is accompanied by a decrease of pitch angle, and the zero pitch position of the blade, therefore, corresponds to the fully leading position of the extension link 18. The position of the lever 20a is, therefore, reversed with respect to that shown in Figures 1 and 3, i. e., projects radially outwardly, so that when it is engaged by the projection 21a of the driving shaft 22, the trunnion block 13 and link 18 are caused to lead with respect to the hub. The operation of the locking device is essentially the same as for the device of Figure 3, but for convenience of mounting, the various parts are differently positioned, plate 31a extending inwardly from the pitch pivot to cooperate with the weighted lever 26a which is pivotally mounted on the hub at a position inwardly of the pitch pivot.

Figure 8:
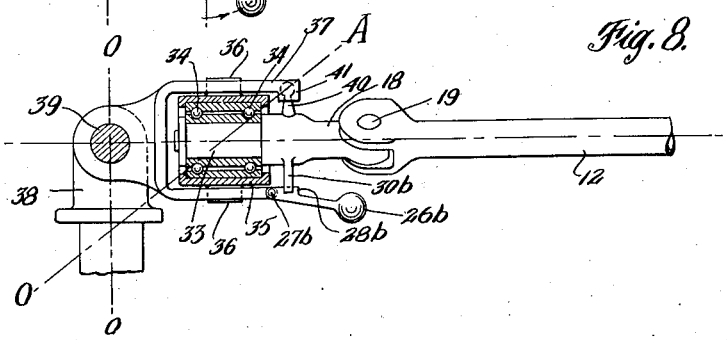

In the modification shown in Figure 8, the obliquely inclined blade articulation pivot is replaced by a compound (resolved) pivot. In this modification the extension link 18, to which the blade spar 12 is connected by means of pivot 19, terminates in a pin 33 rotatably supported by means of bearings 34 in a block 35 having trunnions 36—36 rotatable in a housing 37 which is articulated to the hub 38 by means of a flapping pivot 39. The axis of the trunnions 36 is substantially parallel to the axis 0—0 of the hub 38, and the pivot 33 is substantially coaxial with the longitudinal axis of the blade. Movements about the pivots 33 and 36—36 are correlated by means of an arm 40 mounted on the link 18 and engaging with a fulcrum 41 carried by the housing 37, so that the resultant movement of the blade takes place about a virtual axis OA which is upwardly and outwardly inclined with respect to the axis of the hub.

In this form the centrifugal locking device comprises a weighted lever 26b pivoted at 27b on the housing 37 and having a projection 28b engageable in a notch in the arcuate edge of the plate 30b mounted on the extension link 18. This locking device operates in essentially the same manner as that described above in connection with Figures 3 to 7.

Fig. 9 shows a form of construction similar in many respects to that shown in Fig. 7 and having corresponding parts indicated by the same reference numerals, but in this form of construction the centrifugal force of the blade itself is relied on to lock the blade in the high pitch position when the rotor is autorotating in the same manner as utilised in the form of construction shown in Figures 1 and 2, the auxiliary locking device 26a, 31a of Figure 7 being omitted. As the pitch pivot 14a is inclined inwardly and upwardly with respect to the axis of the hub, the pitch angle increases with lagging of the blade and therefore in autorotative flight the link 18 must be locked in its maximum lagging position with respect to the pivot 14a. The axis of the latter pivot is therefore horizontally offset to the rear of the line of action of centrifugal force is as shown in Figure 10, which is a plan view of the arrangement of Figure 9 and may be compared with Figure 2, having similar reference characters.

It will be seen from Figure 10 that the axis C of the pivot 14a is offset to the rear of the line A—A along which the centrifugal force $F_c$ acts by an amount represented by the distance $e$, so that the centrifugal force exerts a moment $F_c.e$ about the axis C acting on the trunnion block 13 and tending to rotate it in a lagging direction with respect to the hub. There being in free autorotative flight no pressure between the projection 21a and the lever 20a, the trunnion block 13 is displaced by the centrifugal restoring moment in a lagging direction until it is arrested by a stop not shown on the drawing. This condition results in the locking of the pitch pivot in normal autorotative flight with the blade in the high pitch setting.

While the stop devices limiting lag and lead displacements of the blade about the drag pivot 19 in flight operation have been described only in connection with Figures 1 and 2, it will be understood that similar stop devices may be employed for the corresponding hinge in any form illustrated.

In summarizing the operation and advantages of the several embodiments described above, it is first noted that in all arrangements provision is made for pitch change as between a condition suitable for driving the rotor prior to take-off and a condition suitable for normal autorotational flight, the action of centrifugal force being employed in all forms to effect movement of the blade on the pitch pivot from the low pitch position to the higher pitch position and to retain the blade at the higher pitch value during flight.

In the form of Figures 1 and 2, the centrifugal force acting on the blade itself is relied upon for the above purpose, the axis of the pitch pivot being offset sufficiently to ensure that under all conditions of flight operation there will be present a moment great enough to maintain the pitch pivot against the stop (rear end of slot 23) defining the higher pitch value.

Although it may not be necessary in all situations, I prefer to employ some forward offset of the pitch pivot even in the forms of Figures 3 to 6 and 8 inclusive and some rearward offset of the pitch pivot in the form of Figure 7 in all of which an auxiliary centrifugally actuated device is employed to effect positive locking of the pitch pivot.

In all arrangements provision is further made for lag and lead oscillations of the blade during normal flight operation about another or drag pivot which, as mentioned above and shown in the several figures of the drawings, may take a variety of positions.

The arrangements of Figures 1 to 7 inclusive, in which the flapping pivot is operatively interposed between the pitch pivot and the blade, are of advantage since, in delivering torque to the blades through the shaft 22 and projections and arms 21 and 20, the movement of the blade on the flapping pivot need not be accommodated by any special flexible drive connection, as would be the case were the flapping pivot operatively interposed between the pitch pivot and the hub.

Similarly, the arrangements of Figures 3 to 7 inclusive are of advantage since the provision of a centrifugal latching device for the pitch pivot is simplified by virtue of the relationship of the pitch and flapping pivots already mentioned.

Still further, by virtue of locating both the flapping and drag pivots operatively outboard of the pitch pivot, movement of the blade about the axes of the flapping and drag pivots always takes place in the same relation to the plane of the blade, regardless of the position of oscillation about the axis of the pitch pivot.

What I claim is:

1. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being forwardly offset (with respect to the direction of rotation of the rotor) from the line of action of centrifugal force on said blade, and driving mechanism for the rotor including a member relatively rotatable with respect to the hub and adapted to cooperate with a blade mounting part to urge the blade from a higher to a lower pitch position on said pivot.

2. In an aircraft sustaining rotor having a hub and a blade, pivot mechanism connecting the blade with the hub including a pivot having its axis angled upwardly and outwardly with respect to the longitudinal axis of the blade to provide for decrease of blade pitch upon movement of the blade in a lagging sense and for increase of blade pitch upon movement of the blade in a leading sense, the axis of said pivot being forwardly offset (with respect to the direction of rotation of the rotor) from the line of action of centrifugal force on said blade, and driving mechanism for the rotor including a member relatively rotatable with respect to the hub and adapted to cooperate with a blade mounting part to urge the blade to a lagging position about said pivot and thus from a higher to a lower pitch position.

3. In an aircraft sustaining rotor having a hub and a blade, pivot mechanism connecting the blade with the hub including a pivot having its axis angled upwardly and inwardly with respect to the longitudinal axis of the blade to provide for increase of blade pitch upon movement of the blade in a lagging sense and for decrease of blade pitch upon movement of the blade in a leading sense, the axis of said pivot being rearwardly offset (with respect to the direction of rotation of the rotor) from the line of action of centrifugal force on said blade, and driving mechanism for the rotor cooperating with a blade pivot part and transmitting rotor driving torque thereto to effect pivotal movement thereof in a sense producing a leading movement of the blade and thus pitch change thereof from a higher to a lower pitch position on said pivot.

4. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being forwardly offset (with respect to the direction of rotation of the rotor) from the line of action of centrifugal force on said blade, driving mechanism for the rotor including a member relatively rotatable with respect to the hub and adapted to cooperate with a blade mounting part to urge the blade from a higher to a lower pitch position on said pivot, and stop means limiting pitch change movement of the blade in the negative sense to a position approximating zero pitch.

5. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being forwardly offset (with respect to the direction of rotation of the rotor) from the line of action of centrifugal force on said blade, driving mechanism for the rotor including a member relatively rotatable with respect to the hub and adapted to cooperate with a blade mounting part to urge the blade from a higher to a lower pitch position on said pivot, and stop means limiting pitch change movement of the blade in the positive sense to a position in the autorotational range.

6. In an autorotationally actuable aircraft sustaining rotor having a hub and a blade, pivot mechanism connecting the blade with the hub including a pivot having its axis angled with respect to a plane perpendicular to the axis of rotation of the hub and providing for pitch change movement of the blade, driving mechanism for the rotor cooperating with a blade pivot part and transmitting torque therethrough to the blade in a sense producing a pitching moment effective to positively move the blade from a higher to a lower pitch position on said pivot, and a centrifugally actuated latching device for retaining the blade during normal flight operation in a predetermined position on said pivot in which the pitch of the blade is within the autorotative range.

7. In a bladed aircraft sustaining rotor capable of autorotative actuation in flight, mechanism for mounting the blade on a rotative hub including a pivot providing freedom for lag and lead displacements under the influence of normal flight forces and a pitch change pivot, and driving mechanism for the rotor including a member relatively rotatable with respect to the hub and adapted to cooperate with a blade mounting part to urge the blade from a higher to a lower pitch position about the pitch pivot, movement of the blade about the pitch change pivot being restrained during autorotational actuation of the rotor under the influence of centrifugal force in the absence of a driving torque.

8. In a bladed aircraft sustaining rotor capable of autorotative actuation in flight, mechanism for mounting the blade on a rotative hub including a pivot providing freedom for lag and lead displacements under the influence of normal flight forces and a pitch change pivot, and driving mechanism for the rotor including a member relatively rotatable with respect to the hub and adapted to cooperate with a blade mounting part to urge the blade from a higher to a lower pitch position about the pitch pivot, the axis of the pitch change pivot being horizontally offset from the line of action of centrifugal force on said blade to provide for movement of the blade on the pitch change pivot under the influence of centrifugal force from a lower to a higher value.

9. In a bladed aircraft sustaining rotor capable of autorotative actuation in flight, mechanism for mounting the blade on a rotative hub including a pivot providing freedom for lag and lead displacements under the influence of normal flight forces and a pitch change pivot, driving mechanism for the rotor cooperating with a blade pivot part and transmitting rotor driving torque thereto to effect pivotal movement thereof in a sense producing pitch change movement of the blade about the pitch pivot from a higher to a lower pitch position, and a centrifugally actuated latching device for retaining the blade during normal flight operation in a position in which the pitch of the blade is within the autorotative range.

10. In an aircraft sustaining rotor having a hub and a blade, pivot mechanism connecting the blade with the hub including a pivot having its axis obliquely inclined with respect to the longitudinal axis of the blade to provide for conjo'nt pitch change and lag and lead movement of the blade, a second pivot providing freedom for lag and lead movement of the blade under the influence of flight forces, and a centrifugally actuated latching device for restraining the blade as against movement about the pitch change pivot during normal flight operation.

11. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being forwardly offset (with respect to the direction of rotation of the rotor) from the line of action of centrifugal force on said blade, a second pivot providing freedom for lag and lead movements of the blade under the influence of flight forces, and driving mechanism for the rotor including a member relatively rotatable with respect to the hub and adapted to cooperate with a blade mounting part to urge the blade from a higher to a lower pitch position on the pitch pivot.

12. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being forwardly offset (with respect to the direction of rotation of the rotor) from the line of action of centrifugal force on said blade, a second pivot providing freedom for lag and lead movements of the blade under the influence of flight forces, stop means limiting leading movement of the blade about said second pivot to a position in which the line of action of centrifugal force on the blade passes to the rear of the axis of the pitch change pivot, and driving mechanism for the rotor including a member relatively rotatable with respect to the hub and adapted to cooperate with a blade mounting part to urge the blade from a higher to a lower pitch position on the pitch pivot.

13. In a bladed aircraft sustaining rotor, a hub, a pitch change pivot for a blade of the rotor journalled on the hub with its axis obliquely angled with respect to the longitudinal axis of the blade, a flapping pivot for the blade mounted on the first pivot, and a drag pivot interconnecting the flapping pivot and the blade.

14. In a bladed aircraft sustaining rotor, a hub, a pitch change pivot for a blade of the rotor journalled on the hub with its axis obliquely angled with respect to the longitudinal axis of the blade, a flapping pivot for the blade mounted on the first pivot, and a drag pivot interconnecting the flapping pivot and the blade, the axes of the pitch and flapping pivots substantially intersecting, and the axis of the drag pivot being radially offset from said point of intersection.

15. In a bladed aircraft sustaining rotor, a hub, a pitch change pivot for a blade of the rotor journalled on the hub with its axis obliquely angled with respect to the longitudinal axis of the blade, a flapping pivot for the blade mounted on the first pivot, a drag pivot interconnecting the flapping pivot and the blade, and driving mechanism for the rotor cooperating with a blade pivot part and transmitting rotor driving torque thereto to effect pivotal movement thereof in a sense producing pitch change movement of the blade from a higher to a lower pitch position on said pitch change pivot.

16. In a bladed aircraft sustaining rotor, a hub, a pitch change pivot for a blade of the rotor journalled on the hub with its axis obliquely angled with respect to the longitudinal axis of the blade, a flapping pivot for the blade mounted on the first pivot, a drag pivot interconnecting the flapping pivot and the blade, driving mechanism for the rotor cooperating with a blade pivot part and transmitting rotor driving torque thereto to effect pivotal movement thereof in a sense producing pitch change movement of the blade from a higher to a lower pitch position on said pitch change pivot, and centrifugally operable means for retaining the blade in a positive pitch position within the autorotational range during flight operation in the absence of torque applied to the rotor.

17. In an aircraft sustaining rotor having a hub and a blade, pivotal mounting mechanism connecting the blade with the hub including a mounting member adjacent the blade root and a pivot having its axis angled upwardly and inwardly with respect to the longitudinal axis of the blade to provide for increase of blade pitch upon movement of said member in a lagging sense about said axis and for decrease of blade pitch upon movement of said member in a leading sense thereabout, the axis of said pivot being rearwardly offset (with respect to the direction of rotation of the rotor) from the line of action of centrifugal force on said blade, and driving mechanism for the rotor including a driving element movable relative to and cooperating with a part of said pivotal mounting mechanism and transmitting rotor driving torque thereto to effect pivotal movement thereof in a sense producing a leading movement of said member about said 18. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being horizontally offset (with respect to the direction of rotation of the rotor) from the line of action of centrifugal force on said blade to provide for movement of the blade on the angled pivot under the influence of centrifugal force from a lower to a higher pitch position, and driving mechanism for the rotor including a driving element movable relative to and cooperating with a blade pivot part and transmitting rotor driving torque thereto to effect pivotal movement thereof in a sense producing pitch change movement of the blade from a higher to a lower pitch position on said pivot.

19. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being horizontally offset (with respect to the direction of rotation of the rotor) from the line of action of centrifugal force on said blade to provide for movement of the blade on the angled pivot under the influence of centrifugal force from a lower to a higher pitch position, driving mechanism for the rotor including a driving element movable relative to and cooperating with a blade pivot part and transmitting rotor driving torque thereto to effect pivotal movement thereof in a sense producing pitch change movement of the blade from a higher to a lower pitch position on said pivot, and stop means limiting pitch change movement of the blade in the negative sense to a position approximating zero pitch.

20. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being horizontally offset (with respect to the direction of rotation of the rotor) from the line of action of centrifugal force on said blade to provide for movement of the blade on the angled pivot under the influence of centrifugal force from a lower to a higher pitch position, driving mechanism for the rotor including a driving element movable relative to and cooperating with a blade pivot part and transmitting rotor driving torque thereto to effect pivotal movement thereof in a sense producing pitch change movement of the blade from a higher to a lower pitch position on said pivot, and stop means limiting pitch change movement of the blade in the positive sense to a position in the autorotational range.

21. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being horizontally offset (with respect to the direction of rotation of the rotor) from the line of action of centrifugal force on said blade to provide for movement of the blade on the angled pivot under the influence of centrifugal force from a lower to a higher pitch position, a second pivot providing freedom for lag and lead movements of the blade under the influence of flight forces, and driving mechanism for the rotor including a member relatively rotatable with respect to the hub and adapted to cooperate with a blade mounting part to urge the blade from a higher to a lower pitch position on the pitch pivot.

22. In an aircraft sustaining rotor having a hub and a blade, pivot mechanism connecting the blade with the hub including a pivot having its axis angled with respect to a plane perpendicular to the axis of rotation of the hub and providing for pitch change movement of the blade, the axis of said pivot being horizontally offset (with respect to the direction of rotation of the rotor) from the line of action of centrifugal force on said blade to provide for movement of the blade on the angled pivot under the influence of centrifugal force from a lower to a higher pitch position, a second pivot providing freedom for lag and lead movements of the blade under the influence of flight forces, stop means limiting leading movement of the blade about said second pivot to a position in which the line of action of centrifugal force on the blade passes to the rear of the axis of the pitch change pivot, and driving mechanism for the rotor including a member relatively rotatable with respect to the hub and adapted to cooperate with a blade mounting part to urge the blade from a higher to a lower pitch position on the pitch pivot.

23. In an aircraft sustaining rotor having a generally upright hub and a sustaining blade radiating therefrom, mechanism mounting said blade on said hub including a pivot providing for swinging movements of the blade to different positions about the axis of said pivot under different operating conditions, a latch for locking the blade in at least one of said positions relative to said pivot, and a weight subject to centrifugal force and operable by said centrifugal force for controlling said latch.

24. In an aircraft sustaining rotor adapted to receive a driving torque and having a generally upright hub and a sustaining blade radiating therefrom, mechanism mounting said blade on said hub for movement to different pitch positions under different torque conditions, a latch for locking the blade in at least one of said positions, and a weight subject to centrifugal force and operable by said centrifugal force for controlling said latch.

JAMES ALLAN JAMIESON BENNETT.